Feb. 7, 1939.  E. J. HOUDRY  2,145,877
APPARATUS FOR THERMAL CONTROL OF CONTACT MASSES
Filed Aug. 7, 1935  3 Sheets-Sheet 1

INVENTOR
EUGENE J. HOUDRY
BY
Ira L. Nickerson
ATTORNEY

Feb. 7, 1939.  E. J. HOUDRY  2,145,877
APPARATUS FOR THERMAL CONTROL OF CONTACT MASSES
Filed Aug. 7, 1935  3 Sheets-Sheet 3

INVENTOR
EUGENE J. HOUDRY
BY
Ira L. Nickerson
ATTORNEY

Patented Feb. 7, 1939

2,145,877

UNITED STATES PATENT OFFICE 2,145,877

APPARATUS FOR THERMAL CONTROL OF CONTACT MASSES

Eugene J. Houdry, Rosemont, Pa., assignor to Houdry Process Corporation, Dover, Del., a corporation of Delaware Application August 7, 1935, Serial No. 35,100

3 Claims. (Cl. 23—288)

The present invention relates to treating operations, particularly to treating materials of a fluid nature, and to the thermal control and regulation of such operations. Illustrative operations to which this invention has special application are those involving the contacting of fluids with a contact mass. The operation may be either endothermic or exothermic, for example, and the contact mass may be mere solid spreading material, or of a porous, absorbent nature, possessing to a large or small degree adsorptive or catalytic activity. While the invention is adapted for general use in operations, as above indicated, the particular development herein employed to illustrate it, and to which it has special application, relates to the treatment or conversion of hydrocarbons, especially mineral oils from any source. In certain aspects the invention may be considered an improvement upon or further development of copending application, Serial No. 4,020, filed January 30, 1935, by H. A. Shabaker and R. C. Lassiat (Patent No. 2,108,081, issued February 15, 1938), co-pending application Serial No. 710,612, filed February 10, 1934, by T. B. Prickett (Patent No. 2,084,357, issued June 22, 1937), and Patent No. 1,987,904, issued January 15, 1935 to myself.

A problem of considerable importance in the construction and operation of apparatus suitable for carrying out treatments as indicated, such as the apparatus shown in the appended drawing or in the referred to patents and copending applications, concerns a practical and economical way of supporting tubes or conduits in desired position and in proper communication with fluid passages or compartments. A light, cheap means of support is desired, yet one which is stiff and rigid, can easily be assembled with the other necessary elements of apparatus, and will serve other desired functions.

In carrying out operations, such as contacting operations above referred to, difficulties and disadvantages are often encountered due to the tendency of a part, or parts, of the contact mass to be at or to reach a temperature other than that selected as most favorable for the particular operation. The temperature of such part or parts may be too high or too low, depending upon the character of the operation and the type and arrangement of apparatus employed. One section at which this difficulty is often met with is where the reactant, regeneration medium, or other fluids are brought into heat exchange with the contact material at a temperature other than the desired temperature of reaction, e. g., at the points of introduction of fluid into or withdrawal from the contacting chamber or converter. Very often it is the ends of the converter through which introduction and withdrawal of fluid is made, and the difficulty referred to is likely to be pronounced when the temperature of the fluid is considerably above or below the reaction temperature desired. This last named condition is likely to occur, for example, when the reaction is strongly endothermic and when at least some temperature control is sought by admitting the reactant or other fluid at temperatures above the desired reaction temperature; or contrariwise, where the reaction is decidedly exothermic and fluids are introduced at temperatures below that desired within the converter.

This invention substantially obviates the above described difficulties by supplying or withdrawing heat from or preventing heat exchange with, those parts of the contact mass, the temperature of which tends to get out of line, during the course of operation, with that desired or with that obtaining in other parts of the contact mass. The invention, in one respect, contemplates the supply or removal of heat from the ends of the chamber or converter, where fluids of temperature above or below the desired reaction temperature are introduced or withdrawn at those points. Further, the application to or withdrawal of heat from other or intervening portions of contact material, where desirable, is an object of this invention. To supply apparatus for economically and conveniently accomplishing these advantages and at the same time improving the structure in which the tubes or conduits are mounted and held, are further objects of this invention. Such apparatus is hereafter described which not only serves such purposes, but also provides other advantages in the assembly and operation of the apparatus as a whole. Still other advantages will be apparent from the description which follows.

For a quick understanding of an illustrative embodiment of this invention, reference is had to the accompanying drawings, in which.

Figure 1:
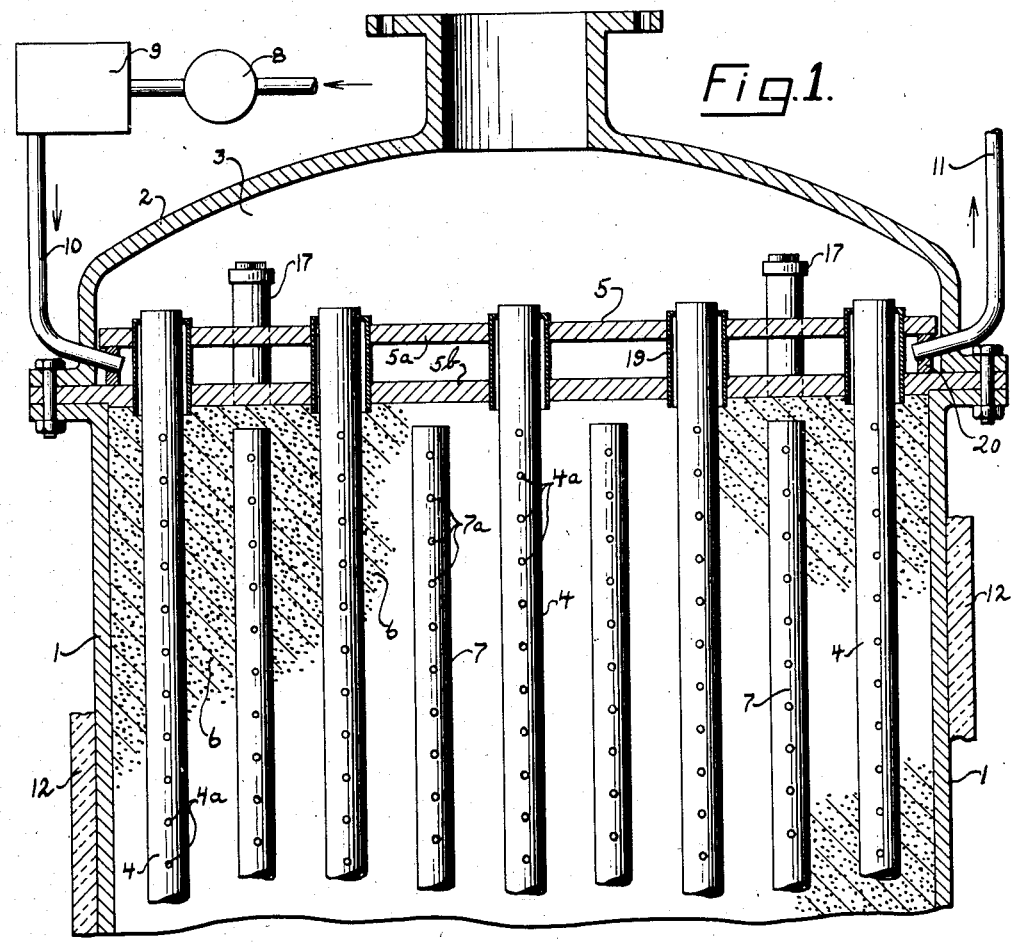
Fig. 1 is a fragmentary view, showing the upper portion of a contacting chamber or converter in sectional elevation.

Referring more in detail to the drawings, in the several figures of which like reference characters denote similar parts, 1 is a converter or treating chamber, having a removable top 2, of dome-like shape confined within which is a manifolding chamber 3. Conduits or tubes 4, communicating with the chamber 3, are mounted in double or composite tube sheet 5. Suitable insulation 12 surrounds the converter.

For the sake of a specific illustration, in operating the apparatus to convert heavy petroleum oils into lighter materials, for example, into gasoline, heavy oil may be introduced in vaporous or atomized form into manifolding chamber 3. Thence it enters conduits 4, through the open ends thereof, and passes therefrom through openings 4a into contact with catalyst or contact mass 6, which fills the space between conduits 4 and 7, but is shown partly omitted for the sake of clarity in the drawings. The fluid resulting from the contacting enters conduits 7, through openings 7a therein, and is led thereby away from the contact mass. For example, the fluid may first be emitted into a suitable manifolding chamber at the lower end of the converter and from there pass to a condenser, storage tank or other treating equipment, as desired.

Such an operation is normally endothermic, i. e. absorbs heat with a consequent tendency for the temperature of the mass to fall below the reaction temperature. At the ends of the chamber there is the further tendency for change of temperature by exchange of heat with any surrounding medium. To overcome this tendency, a temperature controlled fluid is passed into and through the compartment formed between sheets 5a and 5b of composite tube sheet 5. The rate of circulation of the temperature controlled fluid is regulated by rotary pump or pressure fan 8 and its temperature is maintained as desired by means of heater or cooler 9, so that the contact mass adjacent the end of the converter will stay at substantially the same temperature as at points intermediate its two ends. The temperature controlled fluid is introduced through duct 10 into the compartment of the double tube sheet and is led therefrom through duct 11. The fluid may be recirculated through blower 8 and heater or cooler 9, or it may be sent to separate heat exchange equipment, or otherwise disposed of as desired.

Periodically the activity of the contact mass 6 drops to a point of inefficiency and the oil charge must be shut off and a regenerating medium, for example, an oxygen bearing gas such as air, passed through the converter, in the same path through which oil is introduced and products withdrawn, or in any other suitable path as desired. Regeneration is a strongly exothermic reaction and to counteract the tendency of the temperature within the converter to rise, one method employed is the introduction of regeneration medium into the contact mass within the converter at a temperature substantially below the optimum temperature for regeneration. This results in too great a cooling of areas of contact mass adjacent the points of introduction of such medium, unless provision is made to counteract this effect. According to this invention, heat controlled fluid at a temperature substantially above that of the regeneration medium is circulated through the compartment formed within composite tube sheet 5.

Insulation on the lower (or upper) side of sheet 5a of composite tube sheet 5 is optional, as also is insulation around the portions of conduits 4 which extend therethrough, and may be employed, for example, when the operation necessitates a very great temperature difference between the medium in manifolding chamber 3 and the heat controlled fluid.

Figure 4:
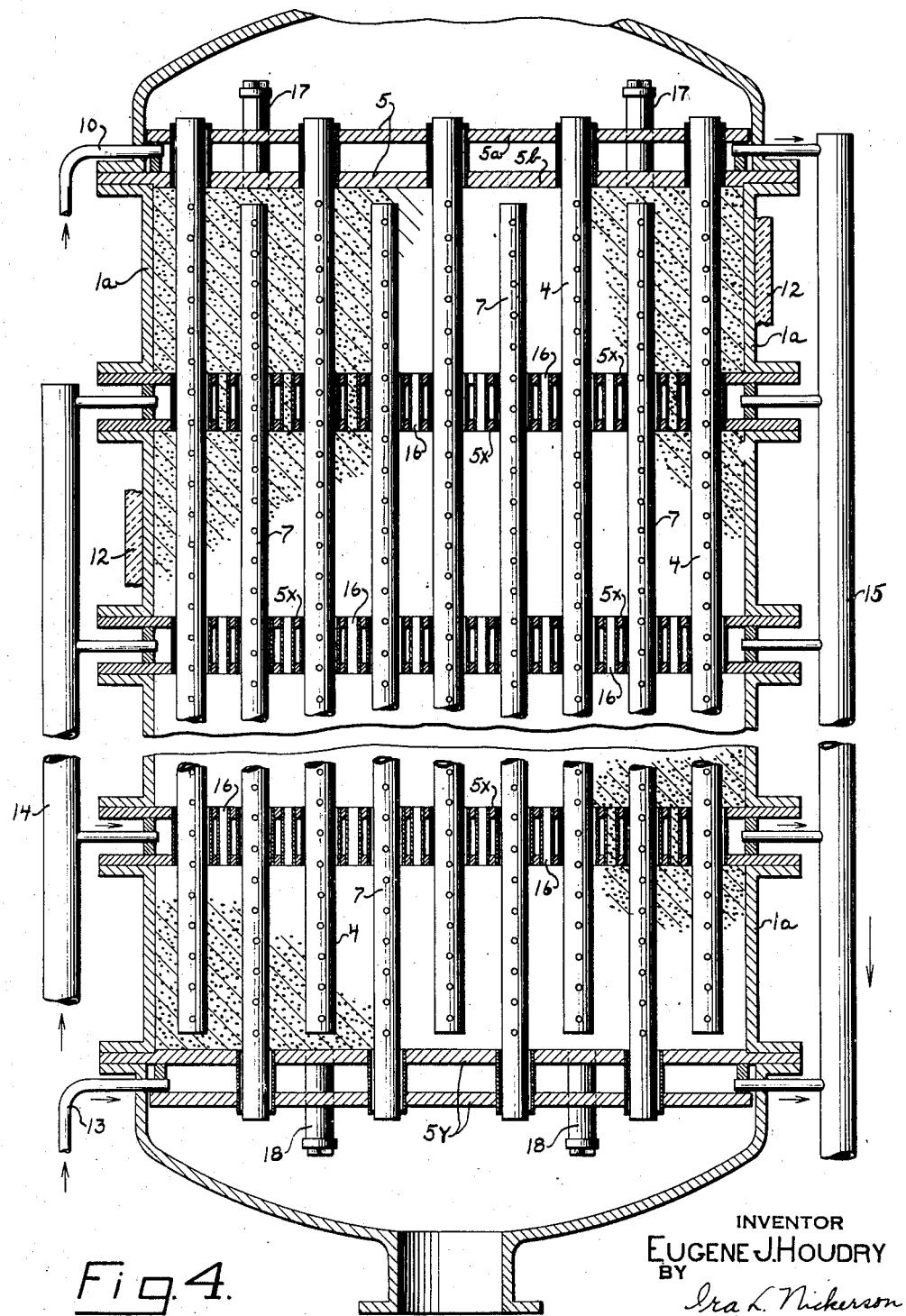
Fig. 4 shows another modification of Fig. 1.

In certain operations there is a problem, not only in controlling the temperature of the contact mass or reaction chamber in areas adjacent the points of introduction of charging stock or regeneration medium, but also in suitably controlling temperatures at points or areas intermediate the two ends of the converter or reaction chamber. For example, where the converter is very tall or the particular apparatus or operation are such as tend to cause a non-uniform deposit of carbonaceous or other material on the contact mass along the length or height of the converter, this problem is apt to be met with. Various other circumstances and various designs of reaction chamber may likewise accentuate this difficulty. According to this invention, such variations in temperature may be ironed out, or at least substantially minimized, as shown in Fig. 4, by providing a plurality of composite members 5x, similar to double tube sheet 5, spaced one from another throughout the height of the converter, intermediate its ends. A double tube sheet 5y, which is virtually a mirror image of tube sheet 5, except for exact location of the mountings of tubes or conduits and of catalyst withdrawal tubes, forms the lower end of the contacting chamber or converter 1a. Temperature controlled fluid is passed into the compartment within composite sheet 5 by means of duct 10, as in the apparatus shown in Fig. 1, and into the corresponding compartment within composite lower sheet 5y through duct 13. The composite members 5x are fed with temperature controlled fluid by supply manifold 14, and ducts leading therefrom to the reaction chambers of each of the composite members. The fluid, after desired heat exchange, is emitted from the compartments of all the composite members through respective ducts connecting the same with withdrawal manifold 15.

All of the intermediate composite members 5x are shown as supplied with temperature controlled fluid from a common manifold. In many types of operation this is satisfactory. In others, however, it will be preferable to supply some of the intermediate composite members with fluid of different temperature from that introduced into other of said members. Such modification is, of course, contemplated.

It will be noted that in the embodiment shown in Fig. 4 the peripheral shell of converter 1a is made up of flanged sections which extend from one composite member to another and act as spacer members therefor, as well as constituting the shell of the converter. The bottom flange of one section is bolted or otherwise joined to the top sheet of one composite member or tube sheet and its top flange is joined to the lower sheet of the composite member next above. Where this construction is employed the converter may be made up from circular flanged sections of standard height.

Composite members 5x, whose compartments are gas tight except for the inlets and outlets for temperature controlled fluid above described, have sleeved openings therethrough of size sufficient for the free passage of conduits 4 and 7. Also sleeved openings or passages 16 are provided at many points throughout the circular area of such members, to provide free flow of catalyst or contact mass down through the converter.

Catalyst filling pipes 17 are mounted in the upper tube sheet 5 and pipes 18 for withdrawing catalyst are mounted in the lower tube sheet 5y.

While the circulation of temperature controlled fluid through the compartments of the several composite members is illustrated as if introduced at a single point on the circumferential periphery of each and withdrawn at a diametrically opposite point, for the sake of simplicity and clarity in the drawings, yet any other system of introduction and withdrawal may be employed where needed to render more uniform the exchange of heat through various horizontal unit areas of such members. For example, fluid may be introduced at several points around one half of the circumference of composite members and withdrawn at several points around the other half thereof. Or, fluid may be introduced at several points spaced uniformly around the entire circumference of such members and withdrawal made from a point adjacent its center, for example, by having the open end of the withdrawal duct extend to such point. Other methods of getting uniform flow of fluid and uniform heat exchange throughout such horizontal, circular area are also within the scope of this invention, and all apply to any or all of the composite members.

A contemplated alternative way of obtaining temperature control, using the composite members or double tube sheets, where the contact mass needs heat supplied thereto, is to employ the compartments of one or more composite members to hold electrical heating elements, which are easily made to automatically hold the temperature at any desired level.

Figure 3:
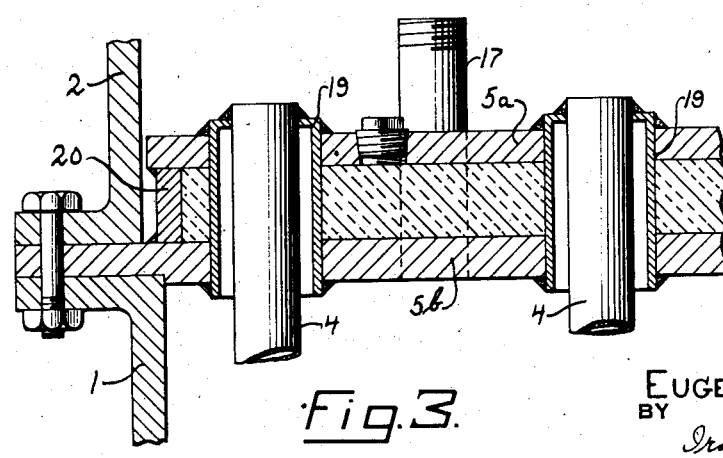
Fig. 3 is an enlarged detail view of a portion of the composite tube sheet shown in Fig. 1, in modified form.
Figure 2:
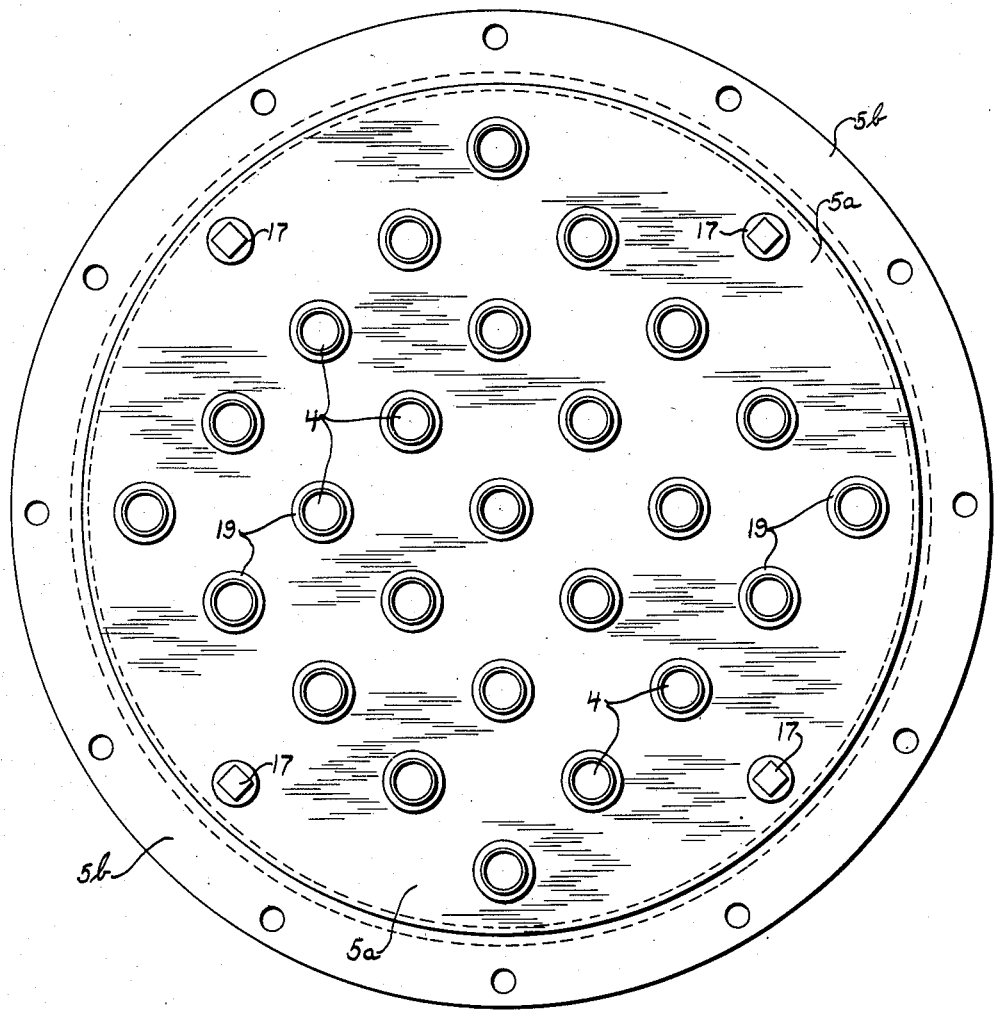
Fig. 2 is a plan view of the converter shown in Fig. 1 with the cover removed, showing the arrangement of distributor (or collector) tubes or conduits in the top, composite tube sheet and omitting catalyst filling pipes, except for a few adjacent the periphery of the tube sheet.

Another way of using my composite, double-sheet members to obtain temperature control is to employ the compartments within such members to hold suitable insulation as shown in Fig. 3 in the enlarged, fragmentary view of a portion of the double tube sheet shown in Fig. 1, in modified form. Ordinarily this modification, where chosen, would be applicable primarily to the tube sheets or composite members which form the ends of the converter, rather than to intervening composite members.

Distinct and apart from the fact that double tube sheet 5 makes possible a very convenient and advantageous method of thermal control, it is to be noted that it provides a highly practical and convenient method of properly supporting conduits, such as conduits 4. The double sheet markedly reduces, if it does not eliminate, all tendency of the conduits to become loosened from the tube sheet at points of gas-tight union therewith, due to unavoidable occurrence of lateral pressures against the free ends of the conduits, or for other reasons. Further, a light tube sheet is provided with a high degree of stiffness or rigidity. Nipples 19 and circular, circumferential member 20 are welded or otherwise firmly connected to upper and lower sheets 5a and 5b of the double tube sheet, thereby, in effect, forming a stiff beam having an interrupted web and being circular in plan view.

In the type of operation where the embodiment of this invention illustrated in Fig. 1 is preferred to that shown in Fig. 4, composite tube sheets may, nevertheless, be employed at both ends of the reaction chamber or converter, each to support a group of the tubes. However, the circulation of temperature controlled fluid will be most needed at the end where relatively cool regeneration fluid is introduced and relatively hot oil vapors are charged during the on-stream portion of the cycle of operation; it will be required to a less extent, where required at all, at the end where products of conversion or of combustion are educted. Of course, oil may be charged through one end and regeneration fluid through the other. In such case thermal control at each end is desirable.

The sheets of the composite members, even those which constitute the tube sheets, need not be widely spaced from each other. They may be spaced relatively much more closely than shown in the drawings, because, where temperature controlled fluid is supplied having the proper temperature, circulation of a small amount thereof, i. e., at a low rate, may be sufficient to maintain the desired control of temperature within the converter.

What I claim is:

1. In combination, apparatus for effecting a catalytic or contact treatment of fluids comprising a casing providing a reaction chamber adapted to contain a body or bed of contact material and a manifolding chamber adjacent an end of said reaction chamber, a composite member separating said reaction chamber from said manifolding chamber, said composite member comprising two sheets of material and a plurality of rigid connecting members distributed throughout the area thereof and firmly holding said sheets in predetermined spaced relation, so as to provide a closed compartment therewithin which is out of fluid communication with both said reaction chamber and said manifolding chamber, at least a portion of the said rigid members consisting of hollow tubular units joined to both of said sheets so as to provide a passageway for fluids through said composite member between said manifolding chamber and said reaction chamber, a plurality of perforated conduits extending within said reaction chamber and adapted to be embedded within said contact material, each of said conduits being mounted on the aforesaid composite member in registering relation with one of the aforesaid hollow tubular units, so that fluid communication between said manifolding chamber and said reaction chamber may take place substantially only through said perforated conduits, and means for introducing heat exchange medium into the said closed compartment of said composite member and for withdrawing heat exchange medium therefrom.

2. In combination, apparatus for effecting a contact or catalytic treatment of fluids comprising a casing providing a reaction chamber and a manifolding chamber adjacent an end of said reaction chamber, catalytic material within said reaction chamber, a composite member separating said reaction chamber from said manifolding chamber, said composite member comprising two sheets of material and a plurality of rigid connecting members distributed throughout the area thereof and firmly holding said sheets in predetermined spaced relation, so as to provide a closed compartment therewithin which is out of fluid communication both with said reaction chamber and said manifolding chamber, at least a portion of the said rigid members consisting of hollow tubular units joined to both of said sheets so as to provide a passageway for fluids through said composite member between said manifolding chamber and said reaction chamber, a plurality of perforated conduits extending within said reaction chamber and embedded in the said catalytic material located therewithin, each of said conduits having an open end thereof extending at least substantially through one of the aforesaid hollow tubular units and mounted on said composite member so that fluid communication between said manifolding chamber and said reaction chamber may take place substantially only through said perforated conduits and further so that the outer walls of each of said conduits are spaced from the inner walls of each of said tubular units throughout the major portion of the length of the latter so as to retard the transfer of heat between parts of the aforesaid composite member and said conduits, and means for introducing heat exchange medium into the said closed compartment of said composite member and for withdrawing heat exchange medium therefrom.

3. In combination, apparatus for effecting a contact or catalytic treatment of fluids comprising a casing providing a reaction chamber and manifolding chambers, one adjacent each end of said reaction chamber, catalytic material within said reaction chamber, partitions separating each of said manifolding chambers from said reaction chamber, a group of perforated conduits for the induction of fluid extending within said reaction chamber and embedded in said catalytic material and communicating through one of said partitions with the manifolding chamber adjacent thereto, a second group of conduits for the eduction of fluid extending within said reaction chamber in interspersed relation with the said induction conduits and having fluid communication through the other of said partitions with the manifolding chamber adjacent to it, at least one of said partitions consisting of a composite member comprising two sheets of material and a plurality of rigid connecting members distributed throughout the area thereof and firmly holding said sheets in predetermined spaced relation, so as to provide a closed compartment therewithin which is out of fluid communication with said reaction chamber and said manifolding chamber, at least a portion of the said rigid members consisting of hollow tubular units joined to both of said sheets, each of the conduits of one only of the aforesaid groups having an open end thereof extending at least substantially through one of the aforesaid hollow tubular units and mounted on said composite member so that fluid communication between said manifolding chamber and said reaction chamber may take place substantially only through said perforated conduits, and means for introducing heat exchange medium into the said closed compartment of said composite member and for withdrawing heat exchange medium therefrom.

EUGENE J. HOUDRY.